No. 700,141. Patented May 13, 1902.
J. G. GRALL.
BUTTON FLY SCALLOPING MACHINE.
(Application filed Jan. 6, 1899.)
(No Model.)
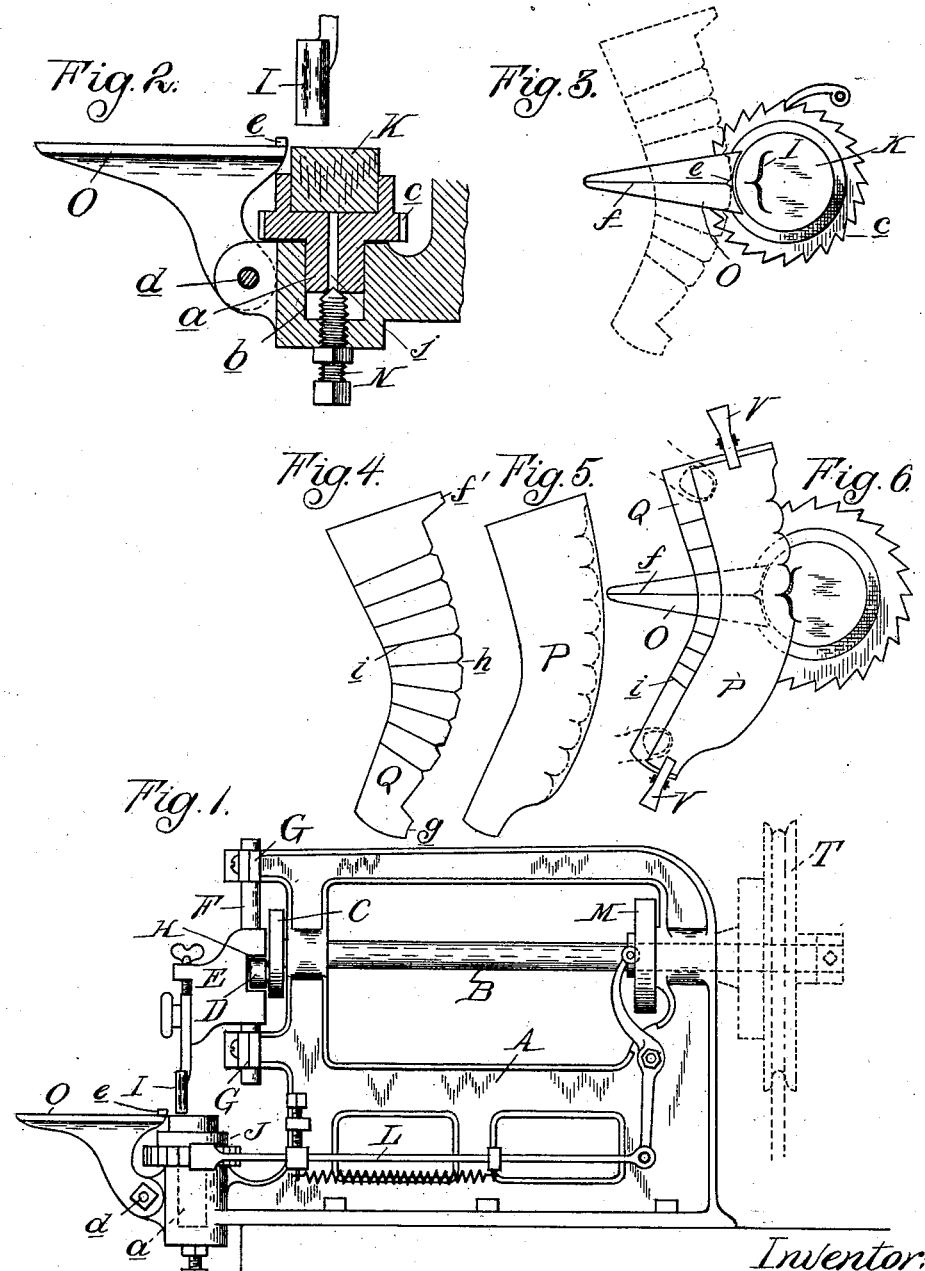
Witnesses:
V. D. Kinner
A. Barthel
Inventor:
Joseph G. Grall,
By Barthel & Barthel
Attorneys.

UNITED STATES PATENT OFFICE.

JOSEPH G. GRALL, OF DETROIT, MICHIGAN, ASSIGNOR, BY MESNE ASSIGNMENTS, TO THE ROBERT MITCHELL MACHINERY COMPANY, A CORPORATION OF MICHIGAN.

BUTTON-FLY-SCALLOPING MACHINE.

SPECIFICATION forming part of Letters Patent No. 700,141, dated May 13, 1902.

Application filed January 6, 1899. Serial No. 701,312. (No model.)

*To all whom it may concern:*

Be it known that I, JOSEPH G. GRALL, a citizen of the United States of America, residing at Detroit, in the county of Wayne and State of Michigan, have invented certain new and useful Improvements in Button-Fly Scallopers, of which the following is a specification, reference being had therein to the accompanying drawings.

This invention relates to machinery for the manufacture of shoes, and it is specifically intended to accomplish the work of trimming the edge of a button-fly of a shoe, and has for its object to produce a machine for this kind of work which will accomplish the work in a more expeditious and perfect manner; and to this end my invention consists in the combination, with a reciprocating knife and work-supporting table, of means for positioning the work in relation to the knife, all as more fully hereinafter described and claimed in the specification and shown in the accompanying drawings, in which—

Figure 1 is a side elevation of my machine. Fig. 2 is an enlarged vertical section of the feed-table. Fig. 3 is a plan thereof, showing in dotted lines the guide-pattern adjusted thereon. Fig. 4 is a plan of the guide-pattern. Fig. 5 is a button-fly blank, showing in dotted lines the work of the machine. Fig. 6 is a plan of the feed-table with the work in position thereon, illustrating the operation of the machine.

A is the frame of the machine; B, the drive-shaft; C, a crank on the drive-shaft; D, a crank-pin on the crank C; E, a cross-head provided with vertical guides F, engaging in vertical guide-bearings G in the frame. H is a horizontal slot in the cross-head into which the crank-pin engages, and I a knife detachably and adjustably secured to the cross-head, all so arranged that if motion is imparted to the drive-shaft the knife I will have a vertical reciprocating motion.

Below the knife is arranged a rotary table J, having a downwardly-projecting central stem $a$, journaled in a vertical bearing $b$ of the frame. This table is formed with a recess in which a wooden cutting-block K is secured and with peripheral ratchet-teeth $c$, by means of which intermittent rotary motion is communicated to the table through the medium of a suitable feed-pawl L, actuated by a cam M on the drive-shaft B. The rotary table J is also provided with suitable means, such as the adjusting-screw N, for adjusting the table higher or lower.

In front of the rotary table is placed the pattern-guide support O, preferably pivotally secured by the bolt $d$ to the frame. Its surface is in a horizontal plane with the top of the cutting-block K, and its inner edge approaches the cutting-block K closely and is provided with an upward projection $e$, placed at the inner end of a line $f$, cut or otherwise marked on the surface of the table, and which line is substantially radial to the cutting-block K.

P represents a button-fly blank prepared as heretofore, the dotted lines showing the manner in which the edge is to be trimmed, and Q is the guide-pattern used in connection therewith in doing the work of trimming. This guide-pattern I make of thin sheet metal with two projecting guide-lugs $f'$ $g$ at the opposite ends and with a series of notches $h$ cut in the front edge, which notches are adapted to fit the projection $e$ of the pattern-guide support. In addition the guide-pattern has a series of lines or marks $i$, one for each notch, which lines are substantially at right angles to the front edge at the point where the lines intersect with the front edge.

The parts being constructed and arranged as shown and described, they are intended to operate as follows: The operator takes the blank (preferably two or more superimposed upon each other) and adjusts it upon the guide-pattern so that it registers at the front edge with the front edge of the lugs $f'$ and $g$, and when so adjusted he holds it in position thereon by means of suitable clamps V, applied to the edge of the guide-pattern, as shown in Fig. 6. The operator then places the guide-pattern with the blank or blanks clamped thereto upon the pattern-guide support O, and by successively engaging each of the notches $h$ with the projection $e$ and registering the guide-mark *i* of each notch with the mark *f* the edge of the button-fly is trimmed off by successive operations of the knife along the dotted lines shown in Fig. 5.

The machine requires but small power, which may be transmitted to it by a sewing-machine belt passing over a grooved pulley T, placed on the drive-shaft, and it may be operated by applying the power continuously or, preferably, through a suitable clutch under the control of a foot-lever, whereby the operator by depressing the foot-lever causes the shaft B to make one revolution.

As devices for this purpose are in common use, I do not deem it necessary to describe it any further.

The knife which I use is of a novel form. It has a vertical blade forming at the lower end a cutting edge which resembles the well-known form of a bracket-mark, and it has a vertical knife-edge which projects in front like a fin and divides the knife into two parts, each of which cuts a little more than one-half of a scallop, while the vertical fin with its lower cutting edge makes a sharp knife-cut between the scallops. By reason of this construction the work of the knife is much superior to that obtained heretofore with a knife shaped like a crescent.

The rotary table J at each revolution of the drive-shaft rotates the distance of one tooth of the ratchet. In this way the cutting-block K will be constantly changed under the knife and wear much longer, and if it has to be cut down the table can be raised up by means of the adjusting-screw N. As the cutting-block K is tightly wedged in its recess, I make a hole *j* through the stem, so that the block can be driven out from the under side. By hinging the pattern-guide support O in front it can be adjusted from or toward the cutting-block K.

The pattern-guide is substantially of the shape of the button-fly, and of course there has to be different sizes, according to the different sizes of blanks, and each guide-pattern is given sufficiently greater width than the button-fly to prevent the marks *i* from being entirely covered up when the blank is affixed thereto. The notches *h* are covered over by the blank; but as the operator holds and guides the work with his hands during the operation he can rely on his sense of feeling to guide the notches *h* properly into engagement with the projection *e*.

While I have described my machine as a button-fly scalloper, it is obvious that it may be advantageously used for other work where the trimming or scalloping has to follow along an irregular line.

What I claim as my invention is—

1. In a button-fly scalloper, the combination with a rotary table, and a vertically-reciprocating scalloping-knife above the table, of a separate guide-pattern adapted to carry the work in fixed relation thereto and projecting with its rear edge in rear of said work, a series of guide-marks on said exposed portion and a support for said guide-pattern on the table having a fixed guide mark or marks with which those of the guide-pattern are adapted to register separately and thereby position the work in relation to the knife.

2. In a button-fly scalloper, the combination with a table and a vertically-reciprocating scalloping-knife above the table, of a separate guide-pattern for the work adapted to support the same and having an exposed portion projecting in rear thereof, and guide-marks formed thereon, means on the guide-pattern for clamping the work thereon in a prescribed position, a support for the guide-pattern adjustably secured in front of said table and means on the guide-pattern and its support for positioning the guide-pattern upon the support in different prescribed positions.

3. In a button-fly scalloper, the combination with the frame and cutting-block supported thereon, of the vertically-reciprocating scalloping-knife, the separate guide-pattern provided with means for clamping the blank thereon, the series of notches cut into the front edge of the guide-pattern, and the pattern-guide support having a projection with which the notches on the guide-pattern are adapted to register.

4. In a button-fly scalloper, the combination with the frame and cutting-block supported thereon, of a vertically-reciprocating scalloping-knife, a separate guide-pattern for supporting the blank thereon and means for locating the guide in prescribed relation to the knife for each scallop, said guide-pattern having projecting lugs at the ends registering with the ends of the blank.

5. In a button-fly scalloper, the combination with the frame and rotary table supported thereon, of the reciprocating scalloping-knife adapted to cut portions of two adjacent scallops, the notched guide-pattern with which the blank is adapted to be registered having a series of guide-marks thereon, and the pattern-guide support having the projection *e* and guide-mark *f*.

6. In a button-fly-scalloping machine, the combination with an intermittent rotary cutting-block, and a vertically-reciprocating scalloping-knife, of a separate guide-pattern for carrying the blank, said guide-pattern having projections at its opposite ends registering with the ends of said blank, a fixed support for said guide-pattern in front of the cutting-block and means on the guide-pattern and its support for adjusting the guide-pattern in predetermined positions in relation to the knife to cut a series of connected scallops along one edge of the blank.

7. In a fly-scalloping machine, the combination with the frame of an intermittent rotary table having a cutting-block secured thereon, a vertically-reciprocating scalloping-knife, a separate guide-pattern for supporting the blank and with which the blank is adapted to be registered, an adjustable pattern-guide support for said guide-pattern in front of the table, a projection on said support, a series of notches on the guide-pattern adapted to be registered with said projection, a series of guide-marks on the pattern-guide, and a guide-mark on the support with which the aforesaid series of guide-marks are adapted to be registered.

In testimony whereof I affix my signature in presence of two witnesses.

JOSEPH G. GRALL.

Witnesses:
OTTO F. BARTHEL,
V. D. KINNER.